United States Patent
Wise et al.

(10) Patent No.: US 8,253,620 B2
(45) Date of Patent: Aug. 28, 2012

(54) SYNTHESIZED APERTURE THREE-DIMENSIONAL RADAR IMAGING

(75) Inventors: Carl D. Wise, Severna Park, MD (US); Norman F. Powell, Ellicott City, MD (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 475 days.

(21) Appl. No.: 12/508,189

(22) Filed: Jul. 23, 2009

(65) Prior Publication Data

US 2011/0018756 A1 Jan. 27, 2011

(51) Int. Cl.
*G01S 13/90* (2006.01)
(52) U.S. Cl. ...................... 342/25 A; 342/180
(58) Field of Classification Search .................. 342/25 A
See application file for complete search history.

(56) References Cited

U.S. PATENT DOCUMENTS

| | | | |
|---|---|---|---|
| 5,341,141 A | 8/1994 | Frazier et al. | |
| 5,579,010 A | 11/1996 | Iihoshi et al. | |
| 5,663,825 A | 9/1997 | Amon et al. | |
| 6,411,255 B2* | 6/2002 | Roederer | 342/371 |
| 6,774,851 B1 | 8/2004 | Cuhaci et al. | |
| 6,965,340 B1* | 11/2005 | Baharav et al. | 342/22 |
| 7,042,397 B2* | 5/2006 | Charrier et al. | 343/700 MS |
| 7,791,552 B1* | 9/2010 | Romanofsky | 343/754 |
| 7,868,829 B1* | 1/2011 | Colburn et al. | 343/700 MS |
| 7,932,868 B2* | 4/2011 | Legay et al. | 343/781 P |
| 2008/0100510 A1 | 5/2008 | Bonthron et al. | |
| 2010/0045514 A1* | 2/2010 | Bartscher et al. | 342/25 R |
| 2010/0104193 A1* | 4/2010 | Takeda et al. | 382/195 |

OTHER PUBLICATIONS

International Search Report for corresponding PCT/US2010/042413 completed Sep. 7, 2010 by Blaine R. Copenheaver of the USPTO.
Northrop Grumman Corporation Electronic Systems: *"White Paper"*; Date: May 8, 2008; pp. 1-14.

* cited by examiner

*Primary Examiner* — John B Sotomayor
*Assistant Examiner* — Matthew M Barker
(74) *Attorney, Agent, or Firm* — Tarolli, Sundheim, Covell & Tummino LLP

(57) ABSTRACT

A synthesized aperture radar imaging system is disclosed. The system includes an antenna reflector and a radar signal transceiver configured to generate a plurality of radar transmission signals and to receive a respective plurality of reflected radar signals. The system also includes a wave reflection device configured to sequentially reflect each of the plurality of radar transmission signals onto separate respective spot-portions of the antenna reflector. The plurality of radar transmission signals can be transmitted from the antenna reflector to a target and reflected from the target as the respective plurality of reflected radar signals. The system further includes a synthesized aperture radar controller configured to integrate the plurality of reflected radar signals and to generate a high-resolution, three-dimensional image of the target from the integrated plurality of reflected radar signals.

20 Claims, 5 Drawing Sheets

SYNTHESIZED APERTURE THREE-DIMENSIONAL RADAR IMAGING

TECHNICAL FIELD

The present invention relates generally to imaging systems, and specifically to synthesized aperture three-dimensional radar imaging.

BACKGROUND

Imaging systems such as radar and ladar imaging allow an image of an object to be generated by interrogating the object with electromagnetic or optical signals, respectively. Reflected signals are analyzed relative to the transmitted signals for differences in characteristics between the transmitted and reflected signals. The differences can correspond to features and/or contours associated with the target object. As such, by analyzing the differences, a two- or three-dimensional image can be formed of the target object. Imaging systems can be used for a variety of purposes and in a variety of environments, such as for security applications.

Signal parameters such as amplitude, time-delay, carrier-frequency, and modulation type are known to affect the performance of simple radar systems and advanced radar based imagery systems using synthetic aperture radar (SAR) techniques. In SAR systems, the motion of the platform hosting the radar transmitter is used to synthesize a much larger antenna aperture, consequently resulting in a higher resolution in one dimension than is possible with the smaller physical aperture used in typical radar systems. The characteristics or parameters of radar signals that are reflected from a target object can be employed to provide imagery of the target.

SUMMARY

One embodiment of the invention includes a synthesized aperture radar imaging system. The system includes an antenna reflector and a radar signal transceiver configured to generate a plurality of radar transmission signals and to receive a respective plurality of reflected radar signals. The system also includes a wave reflection device configured to sequentially reflect each of the plurality of radar transmission signals onto separate respective spot-portions of the antenna reflector. This results in the plurality of radar transmission signals being transmitted from the antenna reflector to a target and reflected from the target as the respective plurality of reflected radar signals. The system further includes a synthesized aperture radar controller configured to integrate the plurality of reflected radar signals and to generate a three-dimensional image of the target from the integrated plurality of reflected radar signals.

Another embodiment of the invention includes a method for synthesized aperture radar imaging. The method includes generating a plurality of radar transmission signals from a radar signal transceiver and sequentially reflecting each of the plurality of radar transmission signals onto separate respective spot-portions of an antenna reflector, resulting in the plurality of radar transmission signals being sequentially reflected from the respective spot-portions of the antenna reflector to a target and receiving a plurality of reflected radar signals corresponding to the respective plurality of radar transmission signals reflected from the target. The method further includes integrating the plurality of reflected radar signals to generate integration data and generating a three-dimensional image of the target from the integration data.

Another embodiment of the invention includes a synthesized aperture radar imaging system. The system includes means for generating a plurality of radar transmission signals from a radar signal transceiver. The system also includes means for sequentially reflecting each of the plurality of radar transmission signals onto separate respective spot-portions of an antenna reflector, resulting in the plurality of radar transmission signals being transmitted from the antenna reflector to a target and reflected from the target as a plurality of reflected radar signals. The system also includes means for receiving a plurality of reflected radar signals. The system further includes means for generating a three-dimensional image of the target based on the plurality of reflected radar signals.

Another embodiment of the invention includes a synthesized aperture radar imaging system. The system includes an antenna reflector and a radar signal transceiver configured to generate a plurality of radar transmission signals and to receive a respective plurality of reflected radar signals. The system also includes a wave reflection device configured to sequentially reflect each of the plurality of radar transmission signals onto separate respective spot-portions of the antenna reflector. This results in the plurality of radar transmission signals being transmitted from the antenna reflector to a target and reflected from the target as the respective plurality of reflected radar signals. The system also includes a synthesized aperture radar controller configured to integrate the plurality of reflected radar signals and to generate a three-dimensional image of the target from the integrated plurality of reflected radar signals. The system further includes a wave reflector controller configured to control the wave reflection device to dynamically adjust a size of the separate respective spot-portions to adjust at least one of scanning speed, image resolution, and scan volume of the target

DETAILED DESCRIPTION

The present invention relates generally to imaging systems, and specifically to synthesized aperture three-dimensional radar imaging. Radar transmission signals are generated by a transmitter. The radar transmission signals can have a frequency range of between about 90 and 600 GHz (e.g., 220 GHz), such that the radar transmission signals can penetrate clothing. The radar transmission signals are reflected from a wave reflection device onto separate respective spot-portions of a substantially parabolic antenna reflector, from which the radar transmission signals are reflected onto a target. By reflecting the respective radar transmission signals to different spot-portion locations on the reflector, target data can be collected from different phase-centers of the respective transmission signals. As an example, the wave reflection device can be a fast scanning mirror or can be a reflectarray. The reflectarray can include an array of phase-shifters that can be individually controlled to phase-shift the radar transmission signals sequentially to direct the radar transmission signals onto the spot-portions of the reflector surface and/or to adjust at least one of scanning time, resolution, and/or scanning volume of the target to be imaged.

The radar transmission signals are reflected from the target and received at a receiver. As an example, the reflected signals can be reflected back onto the respective spot-portions of the reflector and can be reflected by the wave reflection device to the receiver. The reflected signals can then be buffered in a memory device and integrated to form image data. Specifically, by collecting data from horizontal and vertical offsets and implementing a transform of azimuth, elevation, and range information, detailed three-dimensional images can be formed. Based on the reflection of the radar transmission signals onto the respective spot-portions of the reflector, and based on the integration of the received signals to generate the image data, a small reflector (e.g., 100 cm or less) can "synthesize", in effect, a larger radar aperture, thus enabling an improved cross-range resolution (e.g., by two times or more) compared to that achievable by conventional aperture illumination techniques. Thus, images of the target can be obtained at a substantially greater resolution than can typically be performed by such a small reflector. Because of this, the synthesized aperture radar system can provide high resolution imaging at longer ranges. As a result, for example, a target can be imaged to determine the presence of concealed weapons from an adequate standoff distance (e.g., 30 meters or more).

Figure 1:
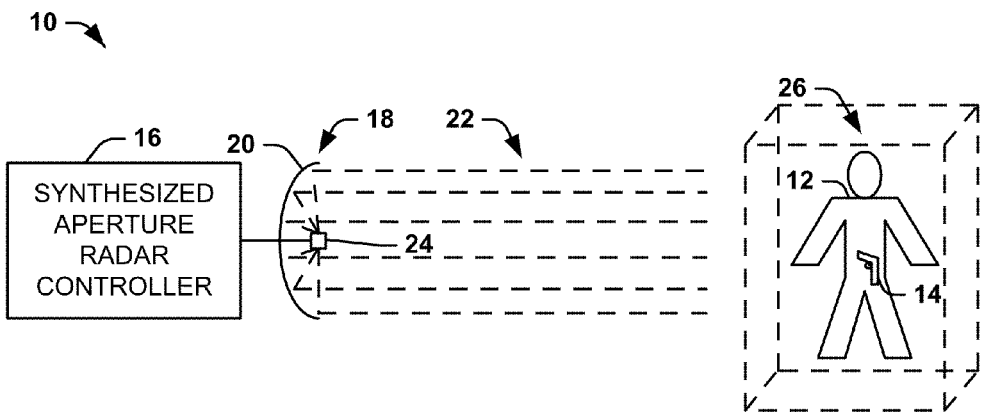
FIG. 1 illustrates an example of a synthesized aperture radar imaging system in accordance with an aspect of the invention.

FIG. 1 illustrates an example of a synthesized aperture radar imaging system 10 in accordance with an aspect of the invention. The synthesized aperture radar imaging system 10 can be used in any of a variety of imaging applications. As an example, the synthesized aperture radar imaging system 10 can be implemented to detect whether a target person 12 is carrying a concealed weapon, demonstrated in the example of FIG. 1 at 14, such as from an adequate standoff range. Thus, the synthesized aperture radar imaging system 10 can be used in a variety of security systems.

The synthesized aperture radar imaging system 10 comprises a radar controller 16 and a radar antenna 18 that includes an antenna reflector 20 having a substantially parabolic shape. The radar controller 16 can generate a plurality of radar transmission signals, such as via a transmitter. As an example, the radar transmission signals can have a very high frequency, such as in a range of between about 90 and 600 GHz (e.g., 220 GHz), such as to penetrate clothing. Each of the plurality of radar transmission signals, demonstrated at 22, can be emitted from the radar antenna 18 to illuminate the target 12. Specifically, the radar antenna 18 can include a wave reflection device 24 that is configured to sequentially reflect each of the plurality of radar transmission signals onto separate respective spot-portions of the reflector 20 to illuminate the target 12.

The radar transmission signals can then be reflected from the target 12 and received by the radar controller 16 via the radar antenna 18. As a result, the received reflected radar signals can be integrated by the radar controller 16 to provide imaging of a three-dimensional volume 26 of the target 12 by the synthesized radar imaging system 10. As explained in greater detail below, the manner in which the radar controller 16 directs the radar transmission signals 22 to illuminate the target 12 can provide very high three-dimensional imaging at substantially high resolution and/or at great distances with a substantially smaller size of the reflector 20 than typical radar imaging systems.

Figure 2:
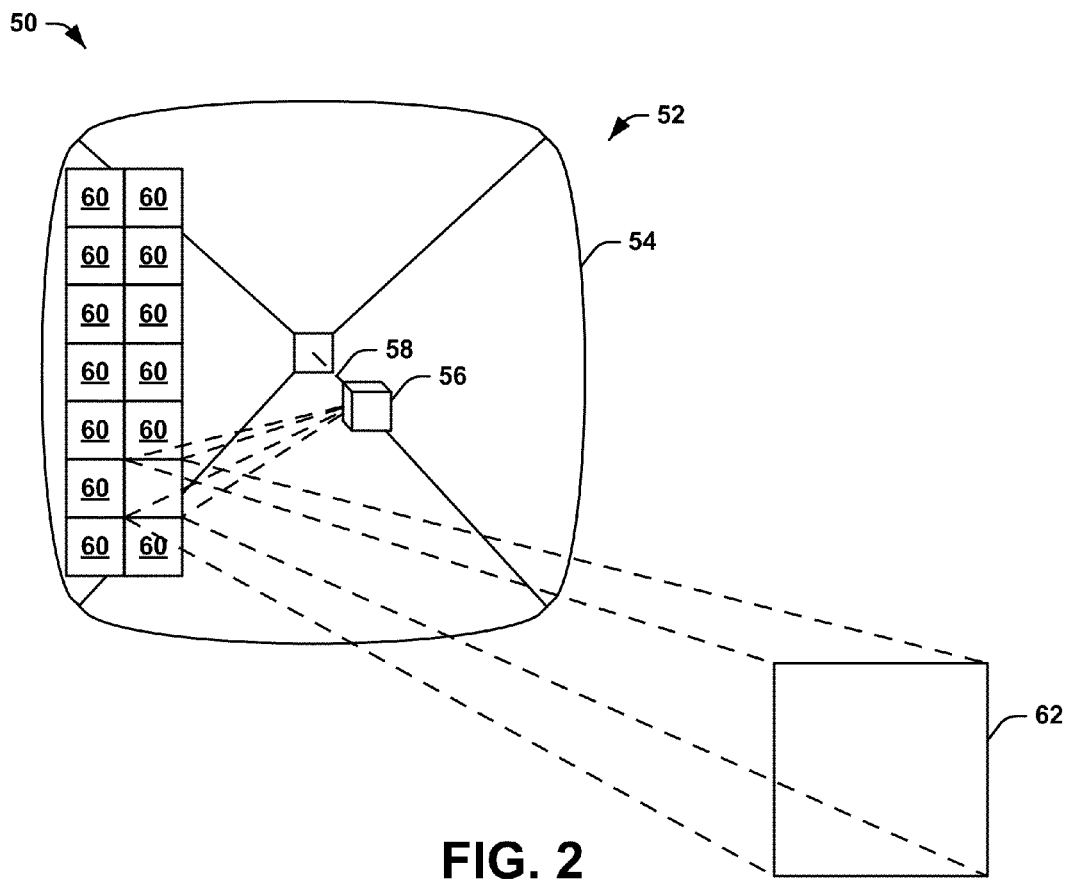
FIG. 2 illustrates an example of a diagram of a synthesized aperture radar scan in accordance with an aspect of the invention.

FIG. 2 illustrates an example of a diagram 50 of a synthesized aperture radar scan in accordance with an aspect of the invention. The diagram 50 includes a radar antenna 52 having a reflector 54, which can each be configured substantially similar to the radar antenna 18 and the reflector 20, respectively, in the example of FIG. 1. Therefore, reference is to be made to the example of FIG. 1 in the following description of the example of FIG. 2.

The radar antenna 52 includes a wave reflection device 56 that extends from the front of and is substantially centered on the reflector 54. A transceiver (not shown) that can be a portion of the radar controller 16 is configured to generate the plurality of radar transmission signals and transmit them to the wave reflection device 56, as demonstrated in the example of FIG. 2 at 58. The wave reflection device 56 is configured to sequentially reflect each of the plurality of radar transmission signals onto an array of separate respective spot-portions 60 of the reflector 54. In the example of FIG. 2, the spot-portions 60 of the reflector 54 are demonstrated as being substantially non-overlapping and square, but it is to be understood that each of the spot-portions can be any of a variety of shapes and can overlap with adjacent spot-portions 60 of the reflector 20. As a result of the radar transmission signals being reflected onto the respective spot-portions 60 of the reflector 54, the radar transmission signals are transmitted from the respective spot-portions 60 of the reflector 54, demonstrated by a wavefront 62 emanating from the reflector 54 in the example of FIG. 2, to scan the three-dimensional volume 26.

As one example, the wave reflection device 56 can be configured as a fast scanning mirror that can be controlled by the radar controller 16. The fast scanning mirror can thus be controlled to sequentially rotate and/or tilt to reflect each of the radar transmission signals to be directed onto each of the respective spot-portions 60 of the reflector 54 based on command signals generated from the radar controller 16. As another example, the wave reflection device 56 can be configured as a reflectarray that is configured as an array of phase-shifters that are individually controlled by the radar controller 16 to provide phase-shift to each of the respective radar transmission signals to sequentially direct each of radar transmission signals onto the respective spot-portions 60 of the reflector 54. In addition, the reflectarray can implement the array of phase-shifters to change at least one of the size and/or shape of the wavefront 62, such as to adjust at least one of scanning speed, resolution of the image of the target 12, and/or size of the three-dimensional volume 26 that is scanned, as described in greater detail below.

Each of the radar transmission signals is reflected from the target 12 in the three-dimensional volume 26 and propagates back to the radar antenna 52. As an example, the wave reflection device 56 can dwell in a given location or configuration corresponding to a specific spot-portion 60 of the reflector 54, such that a reflected wave that corresponds to a specific radar transmission signal is reflected from the target 12 back to the specific spot-portion 60 of the reflector 54, to the wave reflection device 56, and back to the transceiver. The transceiver can then buffer the received signal in a memory (not shown), such that the radar controller 16 can integrate all of the radar transmission signals from an entire scan into a three-dimensional image of the target 12. As an example, an entire scan can correspond to reflection of the radar transmission signals from the entire array of the separate spot-portions 60 of the reflector 54, which could include a portion of or the entire surface of the reflector 54. For example, the synthesized aperture radar imaging system 10 can perform many scans per second (e.g., at 13.7 Hz). As described above, based on imaging the target 12 using a specific frequency band (e.g., between about 90 and 600 GHz), the synthesized aperture radar imaging system 10 can determine the presence of a concealed weapon 14 on the target 12.

Based on the reflection of the radar transmission signals onto the respective spot-portions 60 of the reflector 54, the synthesized aperture radar imaging system 10 provides each of the radar transmission signals as having different phase centers corresponding to separate vertical and horizontal offsets. Therefore, because of the integration of the received signals from the different phase centers of the received signals to generate the image data, a radar antenna 52 having a small reflector 54 (e.g., 100 cm or less) can "synthesize" a much larger radar aperture, thus allowing imaging of the target 12 at a significantly improved resolution and with greater signal-to-noise ratio (SNR) than can typically be performed by such a small reflector 54. As an example, the synthesized aperture radar imaging system 10 can achieve approximately two-times the resolution of conventional aperture radar imaging systems. Specifically, the synthesized aperture radar imaging system 10 can provide very high resolution imaging at great distances with a substantially smaller size of the reflector 54 than typical radar imaging systems. In addition, the synthesized aperture radar imaging system 10 can be implemented to obtain three-dimensional imaging of the target 12, as opposed to that which is achievable with conventional aperture radar imaging systems. For example, the synthesized radar imaging system 10 can achieve about 2.5 centimeter range resolution and about 5 centimeter azimuth and elevation resolution for an about 2.5 meter cube of the three-dimensional scanning volume 26 at a range of about 30 meters or more for an about 70 centimeter or less width of the reflector 54. As a result, as one example, the target person 12 can be imaged to determine the presence of the concealed weapon 14 from a substantially adequate standoff distance, thus providing an increased level of security and safety to users of the synthesized aperture radar imaging system 10.

It is to be understood that the synthesized aperture radar imaging system 10 is not intended to be limited to the examples of FIGS. 1 and 2. As an example, although described in the implementation context of detecting a concealed weapon 14 on the target 12, the synthesized aperture radar imaging system 10 can be implemented in any of a variety of imaging applications. As another example, the reflector 54 is not limited to the configuration demonstrated in the example of FIG. 2, but can be configured as any of a variety of different types of reflectors, such as substantially parabolic circular reflectors. Therefore, the synthesized aperture radar imaging system 10 can be configured in any of a variety of ways.

Figure 3:
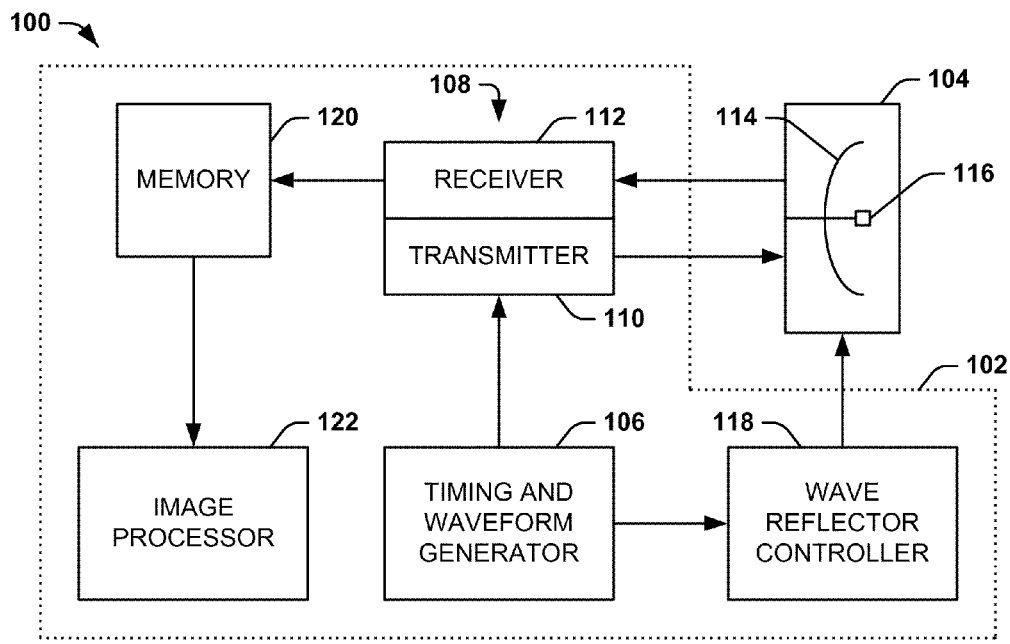
FIG. 3 illustrates another example of a synthesized aperture radar imaging system in accordance with an aspect of the invention.

FIG. 3 illustrates an example of a synthesized aperture radar imaging system 100 in accordance with an aspect of the invention. The synthesized aperture radar imaging system 100 can be implemented to generate images of a target, such as the target 12 in the example of FIG. 1. For example, the synthesized aperture radar imaging system 100 can generate an image of a target to determine the presence of concealed weapons on the target, similar to as described above.

The synthesized aperture radar imaging system 100 includes a synthesized aperture radar controller 102 and a radar antenna 104. The radar controller 102 includes a timing and waveform generator 106. The timing and waveform generator 106 is configured to generate high-frequency radar transmission signals, such as at frequencies in a range of between about 90 and 600 GHz. For example, the timing and waveform generator 106 can generate the radar transmission signals at a frequency that is sufficient to penetrate clothing. The radar transmission signals are provided to a transceiver 108 that includes a transmitter 110 and a receiver 112. The transmitter 110 provides the radar transmission signals to a radar antenna 104 that includes an antenna reflector 114, such as similar to the radar antenna 18 in the example of FIG. 1. Specifically, the radar antenna 104 includes a wave reflection device 116 that can be configured substantially similar to the wave reflection device 56 in the example of FIG. 2.

The timing and wave form generator 106 can also provide timing signals to a wave reflector controller 118. The wave reflector controller 118 can be configured to provide control signals to the wave reflection device 116 of the radar antenna 104 in response to the timing signals provided by the timing and wave form generator 106. The timing signals can thus correspond to a predetermined dwell time that corresponds to an amount of time that the wave reflection device 116 directs a radar transmission signal onto a respective spot-portion of the reflector 114 and waits for a received signal that is reflected from the target. Thus, the timing signals can be generated at predetermined time intervals or can be in response to receipt of the reflected signals.

As an example, the control signals that are generated by the wave reflector controller 118 can correspond to the orientation and/or tilt of a fast scanning mirror that is implemented as the wave reflection device 116 of the radar antenna 104. Therefore, the wave reflector controller 118 can command the fast scanning mirror to be oriented at a specific angle relative to the radar antenna 104 to direct the radar transmission signals to a specific spot-portion of the reflector 114 for a given dwell. As another example, the control signals that are generated by the wave reflector controller 118 can correspond to control signals for an array of phase-shifters of a reflectarray that is implemented as the wave reflection device 116 of the radar antenna 104. Thus, the wave reflector controller 118 can individually command the phase-shifters of the reflectarray to direct and/or shape the wavefront of the radar transmission signals to a specific spot-portion of the reflector 114 for a given dwell.

Figure 4:
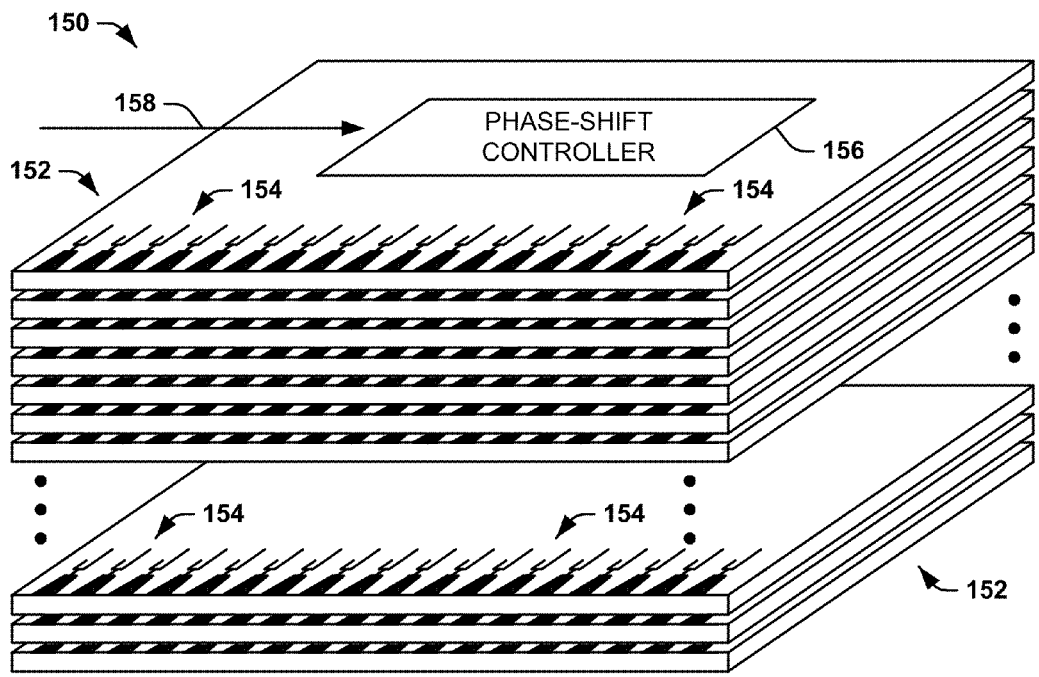
FIG. 4 illustrates an example of a reflectarray wave reflection device in accordance with an aspect of the invention.

FIG. 4 illustrates an example of a reflectarray wave reflection device 150 in accordance with an aspect of the invention. The reflectarray 150 can be implemented as the wave reflection device 56 on the radar antenna 52 in the example of FIG. 2 or as the wave reflection device on the radar antenna 104 in the example of FIG. 3. Therefore, reference is to be made to the examples of FIGS. 2 and 3 in the following description of the example of FIG. 4.

The reflectarray 150 includes a plurality of substrate layers 152 that each includes a plurality of phase-shifters 154. As an example, the reflectarray 150 can include thirty-two substrate layers 152, with each of the substrate layers 152 including thirty-two phase shifters 154, to form an array of 1024 total phase-shifters 154. However, it is to be understood that the reflectarray 150 is not limited to having an equal number of phase-shifters 154 and substrate layers 152, but that the reflectarray 150 can include any number of substrate layers 152 and phase-shifters 154 that can be equal or independent of each other.

The reflectarray 150 also includes a phase-shift controller 156 that is demonstrated on the top substrate layer of the substrate layers 152. Thus, in the example of FIG. 4, the reflectarray 150 includes a single phase-shift controller 156 that controls all of the phase-shifters 154 on all of the substrate layers 152. It is to be understood, however, that the reflectarray 150 can include multiple phase-shift controllers 156. The phase-shift controller 156 receives control signals from the wave reflector controller 118 in the example of FIG. 3, demonstrated in the example of FIG. 4 at 158. As an example, the wave reflector controller 118 can be communicatively coupled to the phase-shift controller 158 via a serial bus or other type of connector. The phase-shift controller 156 can thus individually command the phase-shifters 154 based on the control signals 158 that are provided by the wave reflector controller 118 to provide respective controlled amounts of phase-delay of a given radar transmission signal from each of the phase-shifters 154. As a result, the reflectarray 150 can direct and/or shape the wavefront of the each of the radar transmission signals to a specific spot-portion of the reflector 114 of the radar antenna 104 for a given dwell. In addition, the reflectarray 150 can shape the size of the wavefront of each of the radar transmission signals, such as to adjust one or more of scan speed, resolution, and/or volume of the area scanned.

Figure 5:
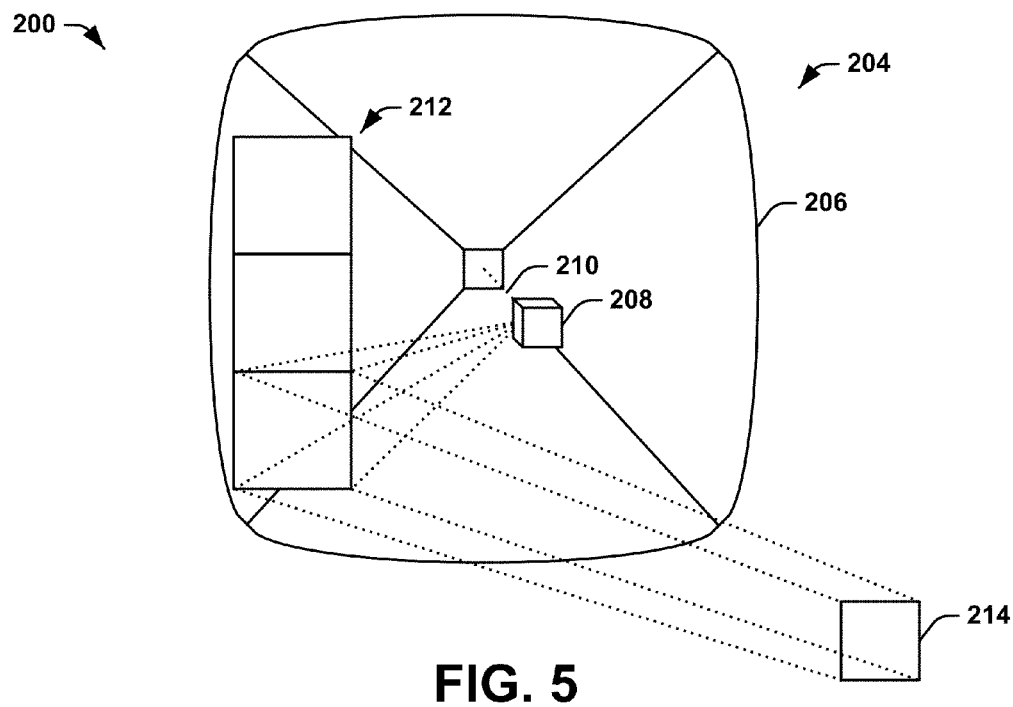
FIG. 5 illustrates another example of a diagram of synthesized aperture radar scans in accordance with an aspect of the invention.
Figure 6:
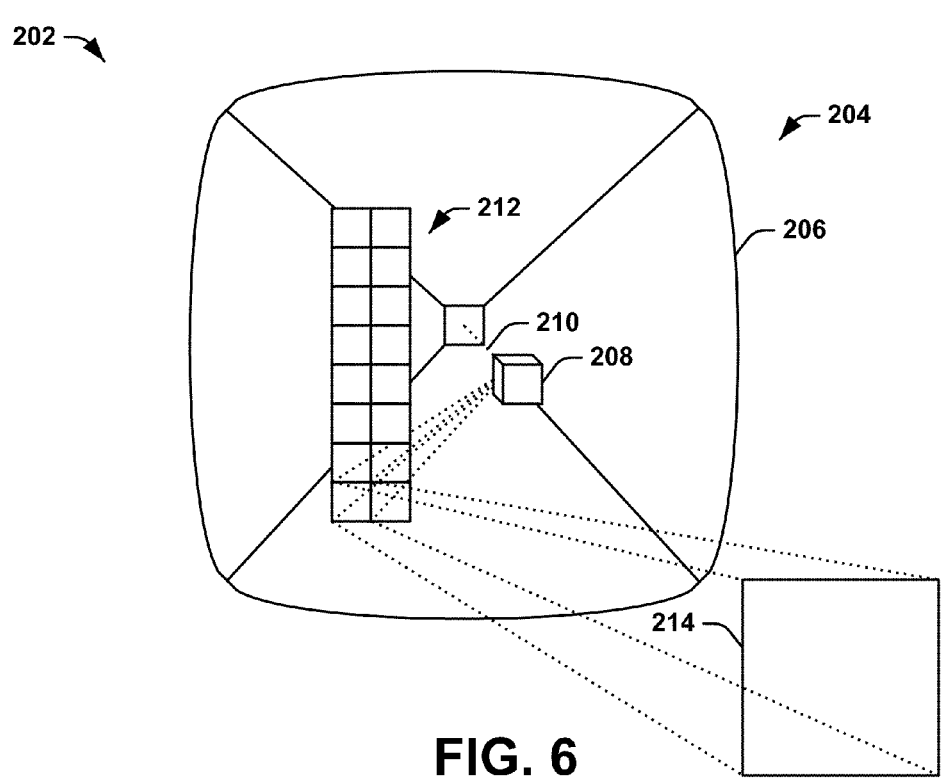
FIG. 6 illustrates yet another example of a diagram of synthesized aperture radar scans in accordance with an aspect of the invention.

FIGS. 5 and 6 illustrate an example of additional diagrams 200 and 202, respectively, of synthesized aperture radar scans in accordance with an aspect of the invention. The diagrams 200 and 202 each include a radar antenna 204, which could correspond to either of the radar antennas 18 and 110 in the examples of FIGS. 1 and 3. Therefore, reference is to be made to the example of FIGS. 1 and 3 in the following description of the examples of FIGS. 5 and 6.

In the examples of FIGS. 5 and 6, the radar antenna 204 includes an antenna reflector 206 and a reflectarray 208 that extends from the front of and is substantially centered on the reflector 206. A transceiver (not shown) is configured to generate the plurality of radar transmission signals and transmit them to the reflectarray 208, demonstrated in the examples of FIGS. 5 and 6 at 210. The reflectarray 208 is configured to sequentially reflect each of the plurality of radar transmission signals onto separate respective spot-portions 212 of the reflector 206. In the examples of FIGS. 5 and 6, the spot-portions 212 of the reflector 206 are demonstrated as being substantially non-overlapping and square, but it is to be understood that each of the spot-portions 212 can be any of a variety of shapes and can overlap with adjacent spot-portions 212 of the reflector 206. As a result of the radar transmission signals being reflected onto the respective spot-portions 212 of the reflector 206, the radar transmission signals are transmitted from the respective spot-portions 212 of the reflector 206, demonstrated by a wavefront 214 emanating from the reflector 206 in the examples of FIGS. 5 and 6, to scan the three-dimensional volume that is to be imaged.

The diagram 200 demonstrates an example of a scan in which the reflectarray 208 shapes the wavefront of the radar transmission signals to illuminate larger spot-portions 212 of the reflector 206, such as relative to the diagram 50 in the examples of FIGS. 5 and 6. As a result, the radar controller 102 can generate less radar transmission signals and less total dwell times for controlling the reflectarray 208. Accordingly, a scan can be performed much quicker than demonstrated in the diagram 50 of the example of FIG. 2. However, such a scan may result in less volume of the three-dimensional scanning region, such as demonstrated at 26 in the example of FIG. 1.

The diagram 202 demonstrates an example of a scan in which the reflectarray 208 shapes the wavefront of the radar transmission signals to illuminate smaller spot-portions 212 of the reflector 206, such as relative to the diagram 50 in the example of FIG. 2. As a result, the radar controller 102 can generate more radar transmission signals and more total dwell times for controlling the reflectarray 208. Accordingly, a scan demonstrated by the diagram 202 can be performed over a longer period of time than demonstrated in the diagram 50 of the example of FIG. 2. However, such a scan can result in more volume of the three-dimensional scanning region, such as demonstrated at 26 in the example of FIG. 1.

Furthermore, the diagram 202 demonstrates that the spot-portions 212 can occupy less than the total area of the reflector 206 for an entire scan, which can result in less resolution of the resulting image. However, the target can be such that a scan with less resolution can be acceptable, such as to preserve processing resources. In addition, the reflectarray 208 can be programmed to adjust the size of the wavefront or the amount of area of the reflector 206 that is involved in a scan from one scan to the next. For example, the synthesized aperture radar imaging system 100 can initially perform a low resolution scan or low volume scan to detect items of interest on the target (e.g., suspected concealed weapons). Upon detecting an item of interest, such as based on exceeding a threshold in a matching algorithm, the synthesized aperture radar imaging system 100 can perform another scan at a higher resolution or at a different volume to more thoroughly scan for the item of interest, such as the concealed weapon. Accordingly, the use of the reflectarray 208 can enable dynamic scanning of the target and/or scanning volume for a variety of purposes.

It is to be understood that the synthesized aperture radar imaging system 100 is not limited to the use of a reflectarray to provide the dynamic scanning capability that is described above with respect to FIGS. 5 and 6. As an example, additional configurations of fast scanning mirrors or other devices can be implemented to provide the phase-delay and/or wavefront shaping of the radar transmission signals to adjust the scanning resolution, speed, and/or volume. For example, the transmitter 110 can implement wavefront shaping to provide phase-delayed and/or wavefront shaped radar transmission signals to the wave reflection device 116 configured as a mirror to provide the dynamic scanning characteristics of the synthesized aperture radar imaging system 100.

Referring back to the example of FIG. 3, each of the radar transmission signals, upon being reflected from the target, are received by the receiver 112 via the radar antenna 104. The reflected signals are then buffered in a buffer memory 120. The radar controller 102 also includes an image processor 122. The image processor 122 is configured to integrate all of the reflected signals that correspond to a scan of the target to generate integration data. As an example, the image processor 122 can process the data corresponding to the reflected signals in the buffer memory 120 via a series of fast Fourier transforms (FFTs) to generate the integration data. The image processor 122 can thus generate an image of the target from integration data. The image can thus be displayed on a display (not shown) at the synthesized aperture radar imaging system 100, or transmitted to another location for display.

Similar to as described above, based on the reflection of the radar transmission signals onto the respective spot-portions of the reflector 114, the radar transmission signals are thus provided from different phase centers, such that the received signals can be integrated with respect to the different phase centers to generate the image data. As a result, the small reflector 114 of the radar antenna 104 can synthesize a much larger radar aperture, thus allowing imaging of a target with substantially greater resolution than can typically be performed by such a small reflector 114. Therefore, the synthesized aperture radar imaging system 100 can provide very high resolution imaging at great distances with a substantially smaller size of the reflector 114 than typical radar imaging systems.

It is to be understood that the synthesized aperture radar imaging system 100 is not intended to be limited to the example of FIG. 3. As an example, the synthesized aperture radar imaging system 100 is demonstrated very simplistically in the example of FIG. 3, such that a number of radar processing components have been omitted from FIG. 3 and the associated description. Thus, it is to be understood that additional radar control components can be included in the synthesized aperture radar imaging system 100, such that the synthesized aperture radar imaging system 100 can be configured in any of a variety of ways.

Figure 7:
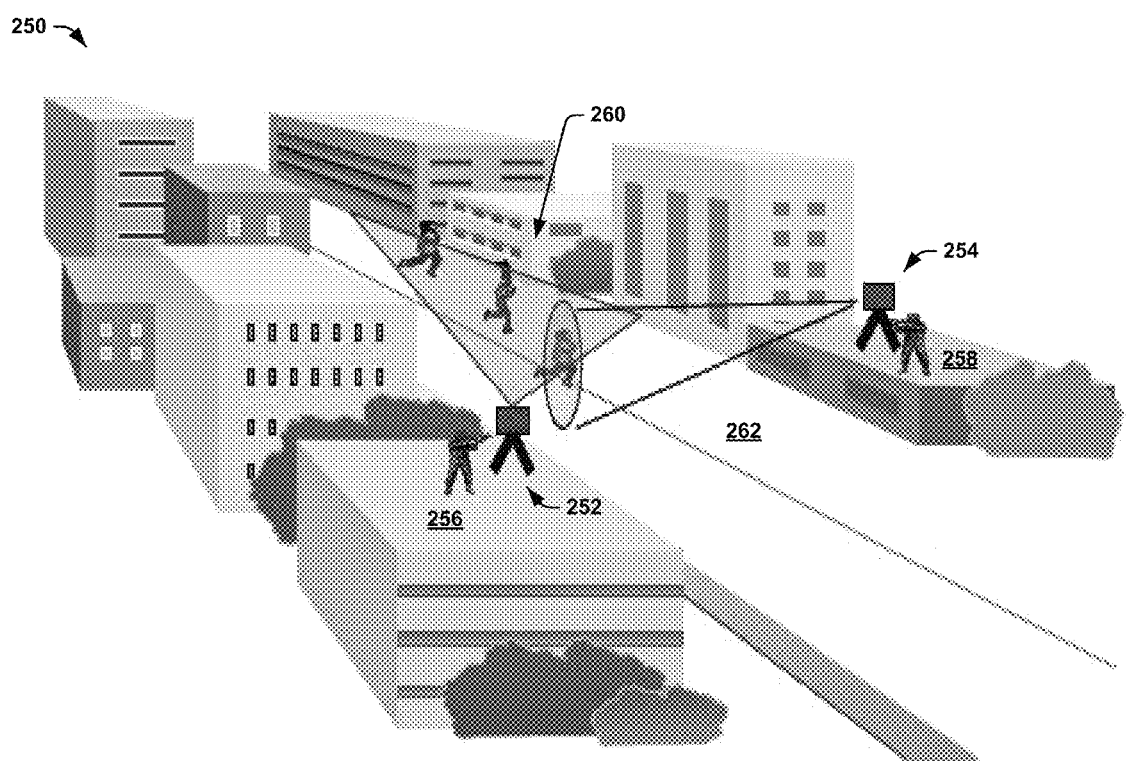
FIG. 7 illustrates an example of a schematic of a theater of operation of a synthesized radar imaging system in accordance with an aspect of the invention.

FIG. 7 illustrates an example of a schematic 250 of a theater of operation of a synthesized radar imaging system in accordance with an aspect of the invention. The schematic 250 demonstrates an urban scene that includes a first synthesized aperture radar imaging system 252 and a second synthesized aperture radar imaging system 254 that are configured in different locations in the theater of operation. In the example of FIG. 7, the first and second synthesized aperture radar imaging systems 252 and 254 each operate from separate rooftops 256 and 258, respectively, to scan a plurality of targets 260 in a street 262 below.

In the example of FIG. 7, the targets 260 are demonstrated as people, such that the first and second synthesized aperture radar imaging systems 252 and 254 can be implemented to scan the targets 260 at an ample resolution and from an adequate standoff distance to determine if they are carrying concealed weapons. Specifically, each of the first and second synthesized aperture radar imaging systems 252 and 254 can be configured substantially similar to the synthesized aperture radar imaging system 10 in the example of FIG. 1, such that the first and second synthesized aperture radar imaging systems 252 and 254 can achieve very high resolution from great distances with small antenna apertures. As such, users of the first and second synthesized aperture radar imaging systems 252 and 254 can easily aim the associated radar antennas at the targets 260 for rapid and high resolution scanning to determine whether the targets 260 carry concealed weapons from safe standoff distances.

In addition, the first and second synthesized aperture radar imaging systems 252 and 254 can be communicatively coupled to work in tandem. As an example, the first synthesized aperture radar imaging system 252 can provide imaging of a larger volume with less resolution, such as to identify targets 260 that may be carrying concealed weapons. Therefore, the second synthesized aperture radar imaging system 254 can be notified of the identified targets 260, such that the second synthesized aperture radar imaging system 254 can provide more resolute imaging of the identified targets 260 for a determination of whether the identified targets 260 carry concealed weapons. Furthermore, the theater of operations demonstrated in the schematic 250 is not limited to the use of two synthesized aperture radar imaging systems 252 and 254, but could include a network of several synthesized aperture radar imaging systems operating together to image targets for a determination of the presence of concealed weapons, such as in very densely crowded streets.

Figure 8:
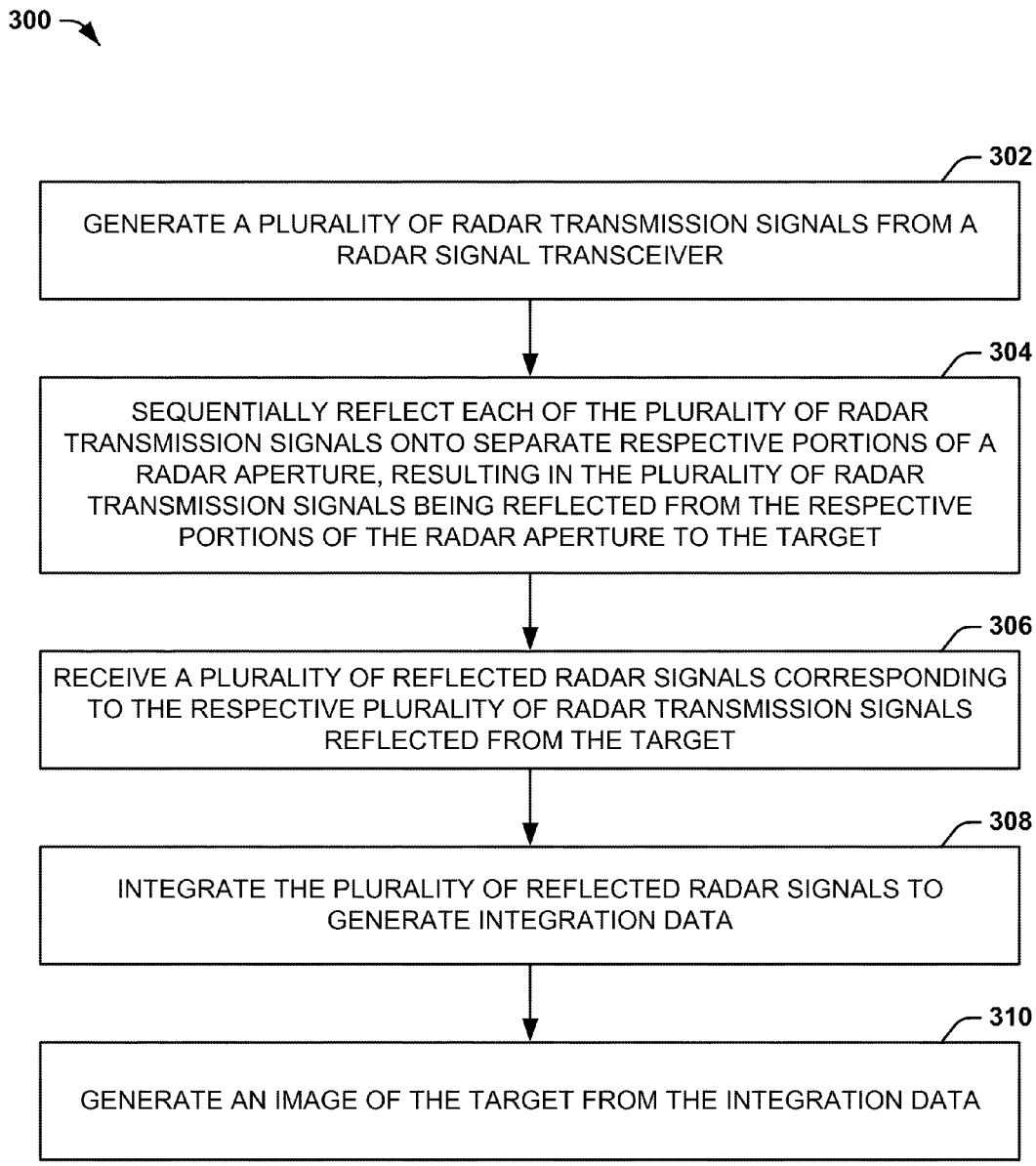
FIG. 8 illustrates an example of a method for imaging a target in accordance with an aspect of the invention.

In view of the foregoing structural and functional features described above, a methodology in accordance with various aspects of the present invention will be better appreciated with reference to FIG. 8. While, for purposes of simplicity of explanation, the methodology of FIG. 8 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect of the present invention.

FIG. 8 illustrates an example of a method 300 for imaging a target in accordance with an aspect of the invention. At 302, a plurality of radar transmission signals are generated from a radar signal transceiver. The radar transmission signals can be generated at a frequency that is sufficient to penetrate clothing, such as between about 90 and 600 GHz. Thus, the radar transmission signals can be implemented to detect whether the target carries concealed weapons.

At 304, each of the plurality of radar transmission signals are sequentially reflected onto separate respective spot-portions of a reflector, resulting in the plurality of radar transmission signals being reflected from the respective spot-portions of the reflector to the target. The reflector can be small (e.g., having a width of less than 100 centimeters) and can be substantially parabolic. The sequential reflection of the radar transmission signals can be based on controlling a wave reflection device, such as a fast scanning mirror or a reflectarray, to direct and/or shape the radar transmission signals onto the reflector. The radar transmission signals reflected from the reflector can have a wavefront that is shaped by a reflectarray to control at least one of scanning speed, scanning volume, and/or resolution.

At 306, a plurality of reflected radar signals corresponding to the respective plurality of radar transmission signals reflected from the target are received. The received signals can be reflected from the reflector based on a dwell of the wave reflection device at the same spot-portion of the reflector. At 310, the plurality of reflected radar signals are integrated to generate integration data. Data associated with the reflected radar signals corresponding to the radar transmission signals from separate phase centers can be stored in a memory that is accessed by an image processor that integrates the reflected signal data using a series of FFTs. At 312, an image of the target is generated from the integration data. The image can be displayed, and can be determinative of whether the target is carrying a concealed weapon beneath his or her clothing.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A synthesized aperture radar imaging system comprising:
    an antenna reflector;
    a radar signal transceiver configured to generate a plurality of radar transmission signals and to receive a respective plurality of reflected radar signals;
    a wave reflection device configured as a reflectarray to collect and phase-delay each of the plurality of radar transmission signals and to sequentially reflect each of the plurality of radar transmission signals onto separate respective spot-portions of the antenna reflector, resulting in the plurality of radar transmission signals being transmitted from the antenna reflector to a target and reflected from the target as the respective plurality of reflected radar signals; and a synthesized aperture radar controller configured to integrate the plurality of reflected radar signals and to generate a three-dimensional image of the target from the integrated plurality of reflected radar signals.

2. The system of claim 1, wherein the reflectarray is further configured to shape the plurality of radar transmission signals to adjust a size of a wavefront of the plurality of radar transmission signals to adjust at least one of scanning speed, image resolution, and scan volume of the target.

3. The system of claim 1, wherein the reflectarray comprises an array of reflection phase-shifters that are individually controlled to retransmit the plurality of radar transmission signals with a predetermined phase-shift to at least one of shape and direct the plurality of radar transmission signals.

4. The system of claim 3, wherein the array of reflection phase-shifters comprises:
a plurality of substrate layers that each comprise a row of the reflection phase-shifters; and
a phase-shift controller on one of the plurality of substrate layers that controls the individual phase-shift of each of the reflection phase-shifters in response to a radar scanning signal.

5. The system of claim 1, wherein the plurality of transmission signals have a frequency in a range of between about 90 GHz and about 600 GHz.

6. The system of claim 1, wherein the antenna reflector has a width of less than 100 centimeters.

7. A security system for detecting concealed weapons on a person comprising the synthesized aperture radar imaging system of claim 1.

8. The security system of claim 7, further comprising a plurality of the synthesized aperture radar imaging systems located at a plurality of distinct locations.

9. A method for imaging a target, the method comprising:
generating a plurality of radar transmission signals from a radar signal transceiver;
sequentially reflecting each of the plurality of radar transmission signals having a predetermined phase-shift via a reflectarray onto separate respective spot-portions of an antenna reflector to individually control an array of reflection phase-shifters to at least one of shape and direct the plurality of radar transmission signals being sequentially reflected from the respective spot-portions of the antenna reflector to the target;
receiving a plurality of reflected radar signals corresponding to the respective plurality of radar transmission signals reflected from the target;
integrating the plurality of reflected radar signals to generate integration data; and
generating a three-dimensional image of the target from the integration data.

10. The method of claim 9, wherein reflecting each of the plurality of radar transmission signals onto the separate respective spot-portions of the antenna reflector via a reflectarray comprises adjusting a size of a wavefront of the plurality of radar transmission signals to adjust at least one of scanning speed, image resolution, and scan volume of the target.

11. The method of claim 9, wherein generating the plurality of radar transmission signals comprises generating the plurality of transmission signals at a frequency in a range of between about 90 GHz and about 600 GHz.

12. The method of claim 11, further comprising detecting concealed weapons on a person based on the image of the target.

13. A synthesized aperture radar imaging system comprising:
means for generating a plurality of radar transmission signals from a radar signal transceiver;
means for sequentially reflecting each of the plurality of radar transmission signals onto separate respective spot-portions of an antenna reflector, resulting in the plurality of radar transmission signals being transmitted from the antenna reflector to a target and reflected from the target as a plurality of reflected radar signals, the means for sequentially reflecting comprising means for adjusting a size of a wavefront of the plurality of radar transmission signals to adjust at least one of scanning speed, image resolution, and scan volume of the target;
means for receiving the plurality of reflected radar signals; and
means for generating a three-dimensional image of the target based on the plurality of reflected radar signals.

14. The system of claim 13, wherein the means for sequentially reflecting comprises means for electronically directing the plurality of radar transmission signals onto separate respective spot-portions of the antenna reflector.

15. The system of claim 13, wherein the means for generating the image comprises means for generating an image of a concealed weapon being carried by the target.

16. A synthesized aperture radar imaging system comprising:
an antenna reflector;
a radar signal transceiver configured to generate a plurality of radar transmission signals and to receive a respective plurality of reflected radar signals;
a wave reflection device configured to sequentially reflect each of the plurality of radar transmission signals onto separate respective spot-portions of the antenna reflector, resulting in the plurality of radar transmission signals being transmitted from the antenna reflector to a target and reflected from the target as the respective plurality of reflected radar signals;
a synthesized aperture radar controller configured to integrate the plurality of reflected radar signals and to generate a three-dimensional image of the target from the integrated plurality of reflected radar signals; and
a wave reflector controller configured to control the wave reflection device to dynamically adjust a size of the separate respective spot-portions to adjust at least one of scanning speed, image resolution, and scan volume of the target.

17. The system of claim 16, wherein the wave reflection device is further configured to dynamically shape the plurality of radar transmission signals to adjust a size of a wavefront of the plurality of radar transmission signals.

18. The system of claim 16, wherein the wave reflection device is configured as a reflectarray configured to collect and phase-delay each of the plurality of radar transmission signals in response to a control signal from the wave reflector controller to retransmit the plurality of radar transmission signals onto the separate respective spot-portions of the antenna reflector.

19. The system of claim 18, wherein the reflectarray comprises an array of reflection phase-shifters that are individually controlled to retransmit the plurality of radar transmission signals with a predetermined phase-shift to at least one of shape and direct the plurality of radar transmission signals.

20. The system of claim 19, wherein the array of reflection phase-shifters comprises:
a plurality of substrate layers that each comprise a row of the reflection phase-shifters; and
a phase-shift controller on one of the plurality of substrate layers that controls the individual phase-shift of each of the reflection phase-shifters in response to a radar scanning signal.

* * * * *